United States Patent [19]
Hubbard

[11] Patent Number: 5,505,585
[45] Date of Patent: Apr. 9, 1996

[54] EFFICIENT MARINE/RAIL INTERMODAL INTERFACE

[76] Inventor: William B. Hubbard, 543 Raven's Ridge Rd., Sequim, Wash. 98382-3829

[21] Appl. No.: 249,302

[22] Filed: May 25, 1994

[51] Int. Cl.$^6$ ................................................ B63B 27/00
[52] U.S. Cl. ................ 414/786; 414/139.4; 414/140.3; 414/141.3
[58] Field of Search ................ 104/26.1, 29; 414/137.1, 414/139.4, 139.9, 140.3, 140.4, 141.3, 141.4, 141.5, 141.6, 142.6, 142.7, 786

[56] References Cited

U.S. PATENT DOCUMENTS

| | | | |
|---|---|---|---|
| 3,024,919 | 3/1962 | Willison et al. | 414/139.9 |
| 3,091,188 | 5/1963 | Graham | 414/139.9 |
| 3,550,796 | 12/1970 | Walda | 414/139.9 |
| 3,631,993 | 1/1972 | Young | 214/16.4 A |
| 3,700,128 | 10/1972 | Noble et al. | |
| 3,812,987 | 5/1974 | Watatoni | 414/141.3 |
| 3,952,891 | 4/1976 | Terayama et al. | 214/152 |
| 4,018,349 | 4/1977 | Hupkes | 414/141.3 |
| 4,090,620 | 5/1978 | Johansson et al. | 214/16 B |
| 4,293,077 | 10/1981 | Makino | 212/219 |
| 4,872,798 | 10/1989 | Ide | 414/141.3 |
| 4,973,219 | 11/1990 | Brickner et al. | 414/792.9 |

*Primary Examiner*—Michael S. Huppert
*Assistant Examiner*—Gregory A. Morse
*Attorney, Agent, or Firm*—Foley & Lardner

[57] ABSTRACT

An efficient marine/rail interface method provides for the discharge of import containers from a container ship to well cars, in the simultaneous discharge of export containers from well cars to an intermodal transition zone. Once the container ship is sufficiently unloaded, export containers from the intermodal transition zone may be loaded onto the container ship. Simultaneously, the ship may be discharged of further import containers. The method also provides for reworking of well cars at an inland port rework area, in communication between the marine/rail interface facility and the inland port rework area via a corridor. A data management system manages the intermodal exchange of containers between ship, rail and truck utilizing a common user electronic data management system.

21 Claims, 15 Drawing Sheets

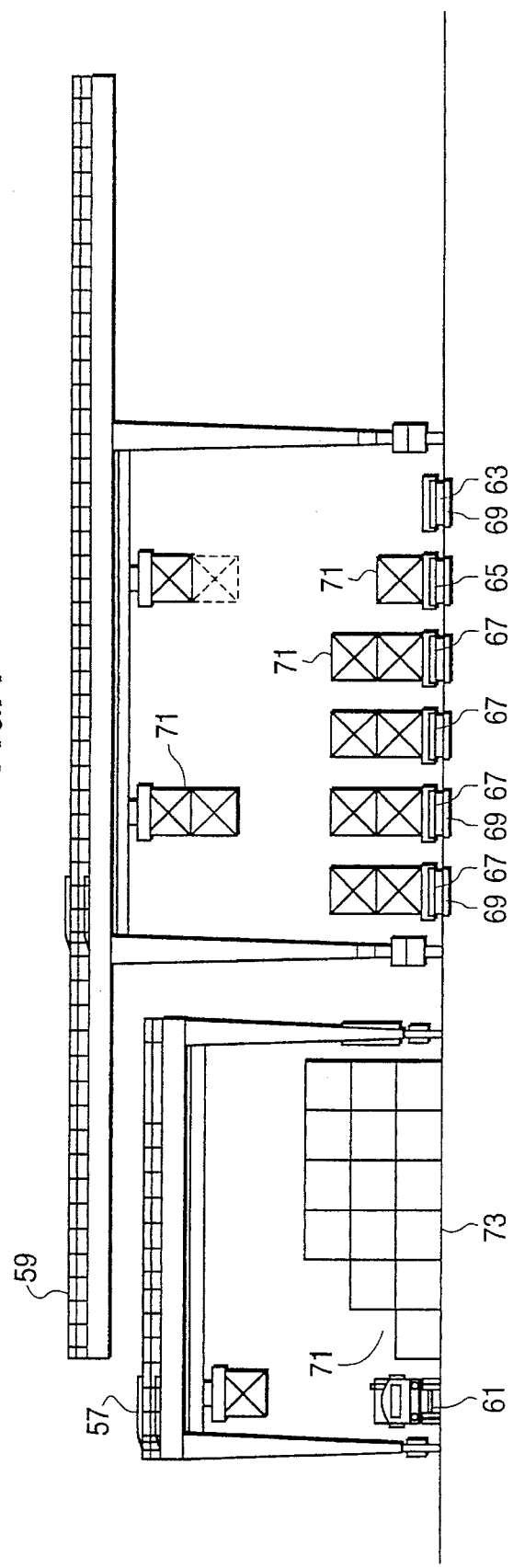

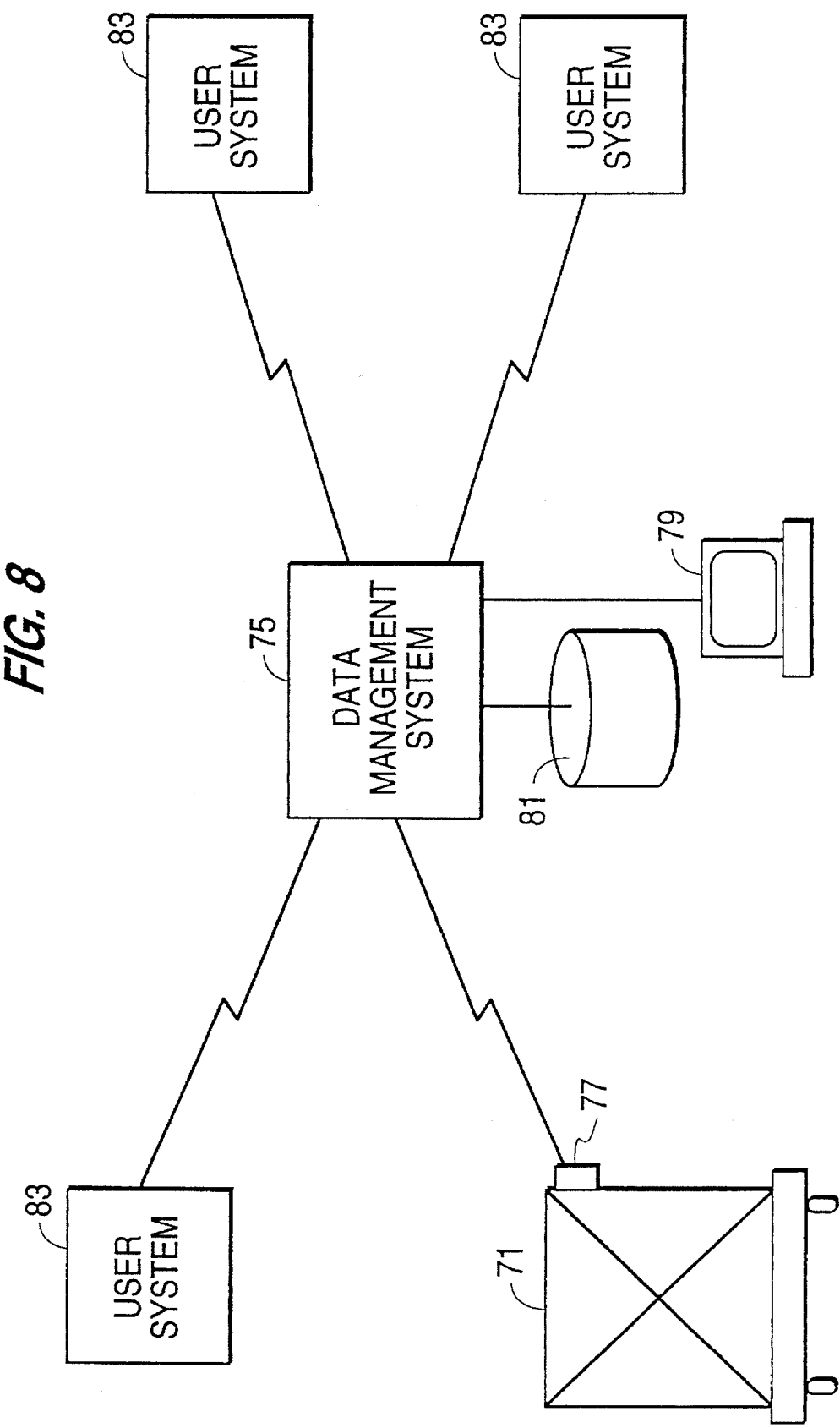

EFFICIENT MARINE/RAIL INTERMODAL INTERFACE

BACKGROUND OF THE INVENTION

1. Field of the Invention

The invention concerns a method and system for efficiently interfacing marine and rail cargo loading and discharging. More specifically, the invention concerns the integrated simultaneous load and discharge of a container ship and a stack train.

2. Description of the Related Art

Traditionally, general cargo for ships has been assembled at the port of loading prior to the arrival of the vessel. Cargo was either accumulated along the side of the vessel, or was stored in warehouses. This was done to ensure that cargo with the proper attributes was immediately available to load the vessel to prevent or minimize any delay to the vessel. Delay to the vessel is arguably the most expensive component of a cargo transportation system.

Cargo discharged from the vessel was also held in the port area adjacent to the vessel, until arrangements for delivery or on-carriage could be made.

The cargo which is accumulated must take into consideration several points. That is, each ship must be loaded and discharged observing a precise protocol. Cargo must be loaded so as to be forwarded to the correct port. Moreover, a vessel must be loaded and weighted properly, and cargo stored in the proper locations. For example, flammable cargo has special requirements. Therefore, vessel stability, port of discharge, special cargo requirements such as temperature control, dangerous and hazardous material regulations, shipper's special requirements and other considerations must all be met.

Prior to the development of the containerized shipping system, the cargo was simply held on the pier or in the warehouse adjacent to the pier.

Containerized shipping was a large improvement over previous systems. When container ships were small, traditional methods still worked.

However, as ship capacity grew, the warehouses or sheds disappeared and the containers were marshalled in large parking lots near the pier waiting for the ship's arrival. In the case of inbound cargo, the containers in the parking lots were waiting for delivery or on-carriage arrangements to be accomplished.

Parking lots are cheaper and easier to develop than covered sheds. Initially, this was considered to be one of the great benefits to be obtained from the containerized shipping system.

However, as the capacity of the typical container ship increased from about 400 twenty ft. equivalent units (TEU's) to over 4,000 TEU's in the span of 30 years, the size of the area required to accommodate storage of the containers dramatically increased. Whereas 25 acres was once adequate capacity for a shipping terminal, shipping terminals in excess of 200 acres are now under construction.

The disadvantage of these large terminals is that land available in port areas is scarce and very expensive. In addition to the scarcity and expense of the resources, the ability to develop available land has become suspect. Environmental concerns virtually preclude significant reclamation from wetlands in the future, thus threatening the ability to develop the available port area land for adequate storage capacity.

Exacerbating the problem is the fact that existing facilities are nearly at capacity. In spite of this, international container ship traffic is expected to double again in the next 10 years.

There have been many attempts to solve this problem. Typically, these attempts envision a scheme for the vertical stacking of the containers, to make more efficient use of available marine terminal land. In these schemes, large parking lots at the point of discharge are still required, in order to assemble the appropriate inventory of containers, so that a sufficient selection of containers with the desirable attributes are available to ensure a proper stow to the vehicle. Generally, containers just discharged from the vessel must be held in this location until arrangements can be made for delivery or on-carriage.

Thus, while the focus of these systems remains the water front property, there remain certain inefficiencies in loading and discharging vessels.

These more traditional methods and devices for use therewith are shown, for example in U.S. Pat. No. 3,631,993, which discloses a containerized cargo storage and handling system. It includes a storage facility for temporarily storing containers which are being exchanged between a ship and trucks and trains. U.S. Pat. Nos. 3,700,128 and 3,952,891 disclose intermodal transfer systems for exchanging goods between ships and land or air vehicles. U.S. Pat. No. 4,973,219 discloses a high density container storage yard used in exchanging goods between transport ships and rail cars. U.S. Pat. Nos. 4,090,620, 4,293,077 and 4,872,798 all disclose varieties of transfer apparatus for directly conducting goods between ships and rail vehicles.

All of the above fail to solve the problem experienced in existing facilities. Moreover, none of the traditional methods and devices discussed above suggest a way to provide adequate storage capacity, while at the same time making the assembly of cargo for vessels with the required characteristics more efficient.

Thus, there remains a need for a method to efficiently utilize existing limited land in port areas. Moreover, there is an unmet need for a more efficient method to load and discharge container ships while observing the relevant requirements.

SUMMARY OF THE INVENTION

Therefore, it is an object of the invention to permit relocation of facilities from the port of loading to areas where there is a more adequate availability of land.

It is another object of the invention to provide a method permitting the use of small areas of land at shipside without loosing the ability to meet the stowage requirements of both ship and train.

Yet another object of the invention is to provide a more efficient method to assemble an inventory of containers to properly stow both a vessel and a train.

A further object of the invention is to permit more efficient use of existing facilities while assembling the proper equipment adequate to stow both vessel and train at current and projected vessel capacity.

One advantage of the present invention is that it utilizes a method of integrating the simultaneous load and discharge of a container ship with the simultaneous load and discharge of a stack train. Another advantage of the invention is that there is a resulting dramatic reduction in the land required to be immediately adjacent to the ship.

A further advantage of the invention is that it permits these storage areas to be moved away from the ship and relocated to an area where more adequate land is available, as for example an inland "port" area.

A further advantage of the invention is that it permits the interfacing of vessels and rail cars with a high degree of timing and reliability. Another advantage which will be realized by use of the present invention is that it minimizes or eliminates local traffic problems and residents' objections associated with close proximity to a port. Another object of the invention is that train cars could originate and terminate at the port complex with little impact upon the actual port area.

Another object of the invention is to provide a more integrated and planned way to interface trains and shipping vessels. Another advantage of the invention is that it would permit the inland port to become a terminus for rail carriers serving the export trade. Trains arriving from the interior with containers for multiple ocean carriers could be unloaded at the inland port terminus, and the containers inventoried until required for loading by an ocean carrier. Trains would be reloaded with cargo destined for inland locations from the inventory of import containers assembled from the containers shuttled from the ocean port.

Another advantage of the invention is that it permits the inland port to serve as an assembly and distribution point for local container traffic, for both international and domestic destinations.

As a result, international cargo destined for the local market could be shuttled from the ship to the inland port terminus and then delivered to the local market. Similarly, the same holds true for containers of international destination which had originated locally. These advantages likewise hold true for the rail system. That is, cargo originating in the rail system destined for local delivery would be discharged from the trains and delivered from the inland port terminus, whereas containers with domestic cargo originating locally and destined for interior points could be also staged at the inland port terminus and integrated with containers with international cargo likewise destined for on-carriage to the interior via rail.

According to the invention, there is provided a method of exchanging export and import containers between a container ship and land transports. A first plurality of import containers is discharged from a vertical cell to a location adjacent to the container ship, the container to be available for transport to one of an intermodal transition zone and an intermodal rail area, and creating a cleared vertical cell. A first plurality of export containers is discharged from a plurality of land transports in the intermodal rail area into the intermodal transition zone. Simultaneously, the container ship and the land transports are discharged and loaded.

According to another aspect of the invention, there is provided a marine/rail discharge and load facility for exchanging export and import containers between a container ship and a land transport. At least one crane is cantilevered to load and unload a container from the container ship onto a location adjacent to the ship, the container to be available for further transport. An intermodal transition zone is provided, and an intermodal rail area is provided. There is at least one first mobile lift operable to transport containers between the location adjacent to the ship and the intermodal transition zone, and is operable to transport containers to the intermodal rail area. At least one second mobile lift is operable to transport containers between a land transport in the intermodal rail area to the intermodal transition zone, and is operable to transport containers to the container ship.

BRIEF DESCRIPTION OF THE DRAWINGS

A preferred embodiment of the invention is described in connection with the drawings, in which:

FIG. 7 is a cross section of the inland port showing one embodiment of the cranes;

FIG. 8 is a common user data management system;

DETAILED DESCRIPTION OF THE PREFERRED EMBODIMENTS

Figure 1:
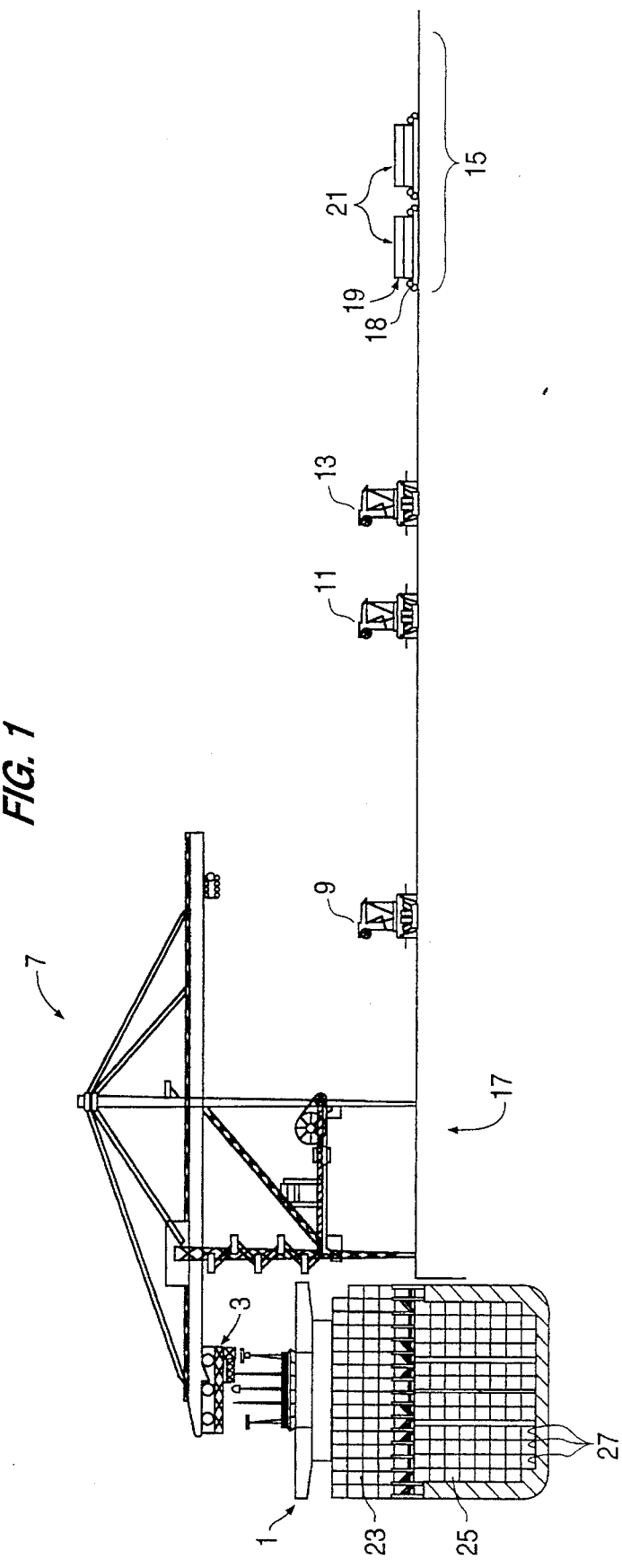
FIG. 1 is a cross section of the efficient marine/rail interface facility at the beginning of an operation.

FIG. 1 illustrates an efficient marine/rail interface terminal at shipside. Illustrated in the figure is a cross section of a container ship 1, an import container being discharged 3, and a crane 7 (illustrated as a gantry crane) discharging the import container 3.

As the operation progresses, the import containers are moved to/from their destination areas by mobile lifts 9, 11, 13 travelling to and from an intermodal rail area 15. The ship 1 is located next to a pier 17, on which the containers 3 are placed.

Illustrated in the intermodal rail area 15 are export containers 18, 19 contained on well cars 21.

FIG. 1 also includes a cross section of a container ship 1, and shows the relevant construction. On the container ship 1, there may be containers 23 stored on hatch covers. Also, there may be containers 25 stored below deck. The container ship is equipped with vertical cells 27. The containers 3, 18, 19, 23 and 25 meet conventional industry standards, including ISO standards. The container ships use these conventional standards. Although a container ship with hatches is illustrated, hatchless container ships also work with the invention.

In the stage of the illustrated embodiment, the container ship 1 is fully loaded with import containers 23, 25, except for the import container 3 to be discharged, which has been engaged by the crane 7. The first mobile lift 9 is in position to transport the container 3, once it has been deposited on the pier 17, to the intermodal rail area 15. Meanwhile, export containers 19, 18 are unloaded from the well car 21 by mobile lifts 11, 13, respectively. By the time that a first import container 3 has been discharged to the pier 17 by the crane 7, picked-up by the mobile lift 9, and transported to the intermodal area 15, the well car 21 will have been unloaded of its export containers 18, 19.

At the beginning of the operation, the import container 3 is stored with the on deck stow (the containers stored on the hatch cover 31). As the operation progresses, all of the containers stored on the hatch cover 23 must be removed, and then the hatch covers and all of the containers in a particular vertical cell 27 must be removed before any containers for export 19 can be loaded into the container ship 1.

With large conventional container ships 1, this can be a total of as many as 105 containers or even more which must be discharged from the vessel hatch before any can be loaded back onto the vessel. (With hatchless vessels, it could be as few as ten per hatch.) According to the invention, as each import container 3 is removed from the ship, it is taken directly to the rail area 15, preferably located on or close to the dock, and preferably immediately loaded to a well car 21. (Well cars are also known within the industry as "double stack cars".)

Figure 2:
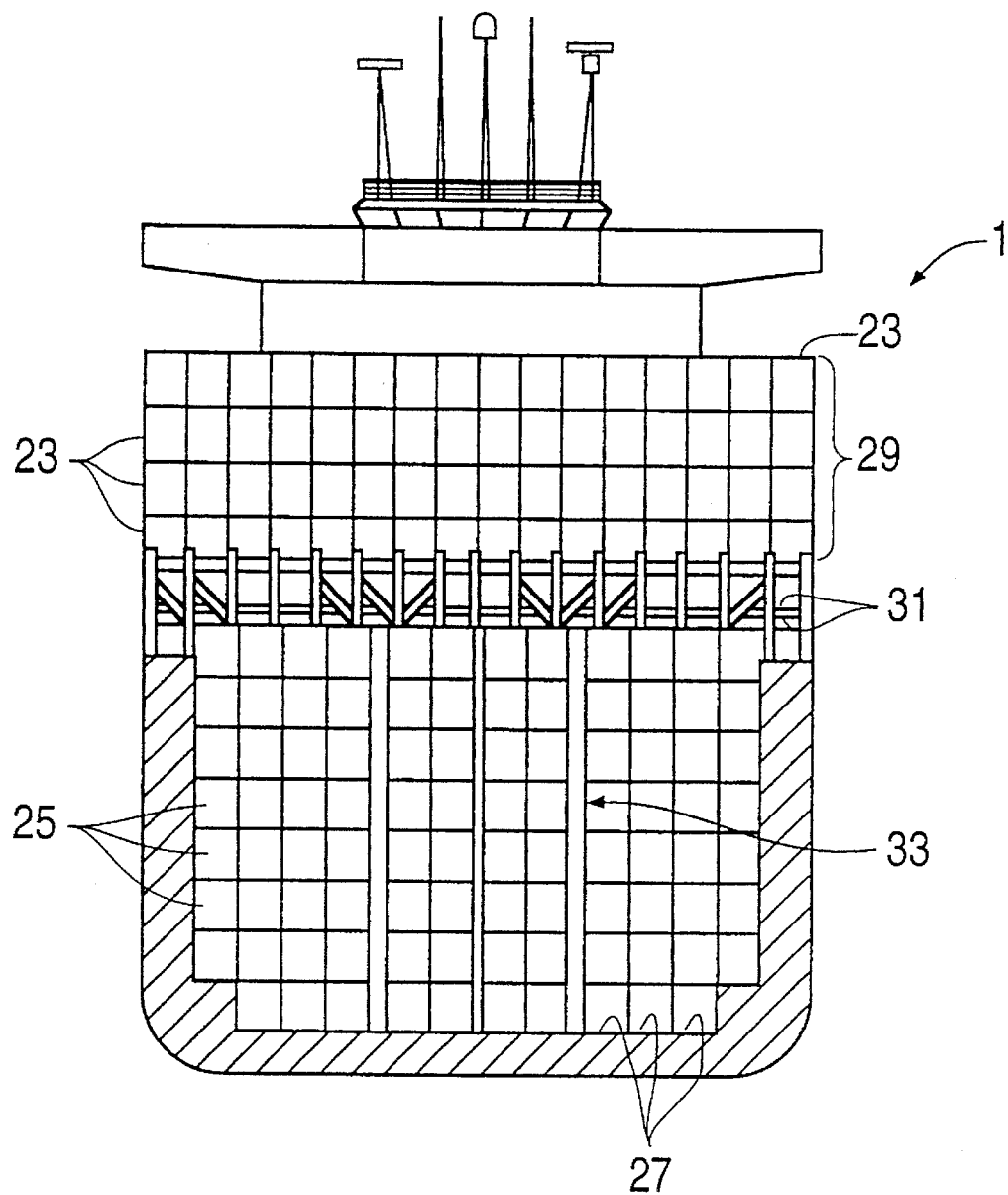
FIG. 2 is a cross section of a typical hatch on a container ship.

Reference is made to FIG. 2 which shows a cross section of a typical hatch on a container ship 1. In the container ship 1 illustrated, all of the spaces in and on deck stow 29 are filled with containers 23 stored on hatch covers 31. The vertical cells 27 are filled with containers 25 in the below deck store area 33. This configuration would be typical of the container ship 1 on arrival before the start of operations according to the invention, with all containers filled with import containers. This configuration would also be representative of the container ship 1 at the completion of operations according to the invention, when the container ship 1 is ready to depart with all container locations filled with containers for export.

According to the conventional method, all of the containers 23, 25 are unloaded from the container ship 1, following which containers located adjacent to the ship are loaded onto the ship. This requires a significant amount of space closely adjacent to the ship 1. In particular, this method requires the removal of all of the on deck stow 29, followed by removal of the hatch covers 31 and complete removal of containers 25 within one vertical cell 27. At that point, the single vertical cell 27 can be reloaded with export containers. Typically, vertical cells 27 on the port and starboard sides will be alternated in the unloading/loading step.

Figure 3:
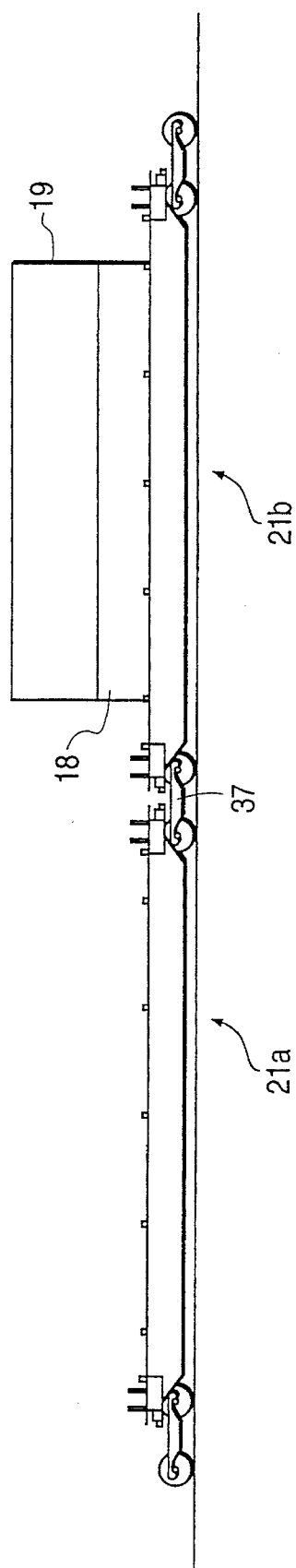
FIG. 3 is a side view of a typical well car.

FIG. 3 illustrates a conventional well car or double stack car, both unloaded 21*a* and loaded 21*b*. The double stack car or well car is specially designed for loading containers 18, 19 two high.

Figure 4:
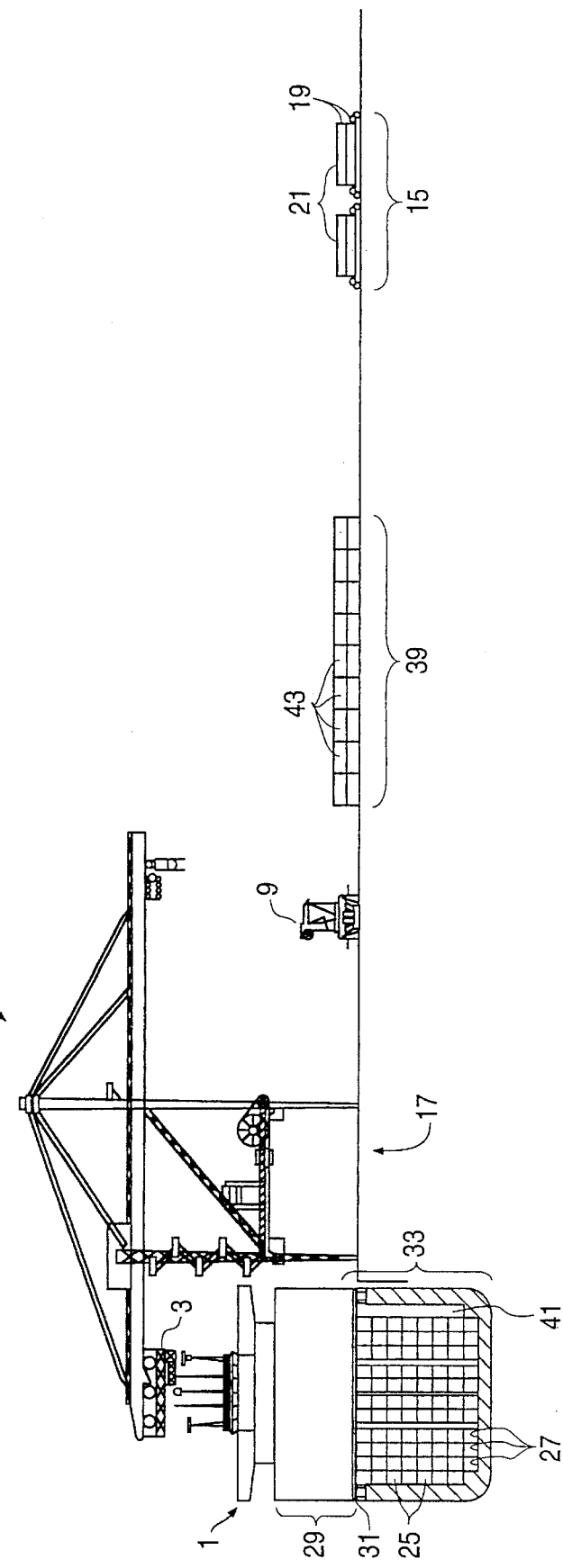
FIG. 4 is a cross section of the efficient marine/rail interface facility at a point when the containers in the on-deck stow area of the hatch have been removed, the hatch covers removed and several containers in the vertical cell removed.

FIG. 4 illustrates a cross-section of the efficient Marine/ Rail Interface facility at a point in time when the on deck stow 29 has been removed, the hatch covers removed, and several containers 25 in a vertical cell 27 have been removed, to create a cleared vertical cell 41. Each import container discharged from the vessel from the on deck stow 29 and the cleared vertical cell 41 has been removed from the container ship 1 by the crane 7, placed onto the pier 17, picked up by the mobile lift 9, and then placed in the intermodal rail area 15, and loaded into one of the well cars 21. At the same time, containers 19 are removed from the well cars 21 by a mobile lift (11, 13 illustrated in FIG. 1) and placed in an intermodal transition zone 39. Intermodal transition zone containers 43 are stored in the intermodal transition zone 39 in a manner so as to be randomly accessible as required for loading onto the container ship 1. For example, it is advantageous to stack the containers 43 two high in rows sufficiently separated for operation of a mobile lift.

Thus, at the same time that the container ship 1 is having import containers 29, 25, 3 discharged, the double stack rail cars 21 loaded with containers 19 for export also commence unloading. However, unlike the container ship 1, only two containers 19 must be removed from each well car 21 before import containers can be loaded back to the well car 21. Therefore, by the time the first import containers 3, 23, 25 have been discharged from the ship and reach the intermodal rail area 15, an empty well car 21 will be available for loading of those containers.

The containers 19 destined for export cannot be loaded onto the container ship 1 until the deck of the container ship 1 has been cleared of the on deck stow 29 and one cleared vertical cell 41 is available. Until this condition is reached, the export containers 19 are stored in the intermodal transition zone 39, which is preferably in the marine yard adjacent to the container ship 1. Thereafter, import containers 25 can be discharged simultaneous to export containers being loaded.

Consider the following example of the above operation. At the start of operations, a container ship 1 arrives full of import cargo, including containers 23 stored in the on deck stow 29 and containers 25 stored in the below deck stow 33. There are some export containers on well cars 21.

The on deck stow 29 is cleared with the crane 7, onto the pier. Each container 3 is picked up by the mobile lift 9 from the pier 17 and transported to the intermodal rail area 15, where it is placed in a well car 21. Meanwhile, export containers 19 are removed from the well car 21 and placed in the intermodal transition zone 39. This process is repeated until the on deck stow 29 is clear and there is a cleared vertical cell 41. The containers that were in the on deck stow 29 of the container ship 1 are now on the well cars 21; and the export containers that were on the well cars 21 are now in the intermodal transition zone 39.

Thus, the operation as thus far described begins with a one-way discharge of import containers 3 from the container ship 1 and a simultaneous discharge and load of well cars 21 destined for a train. Export containers 19 are removed from a well car 21 and immediately replaced with import containers 3 just discharged from the container ship 1.

The ship maintains a discharge only operation until the on deck stow 29 has been cleared and a cleared vertical cell 41 has been created. At this point, an inventory of intermodal transition zone containers 43 for export is accumulated in the intermodal transition zone 39, the number of these containers being equal to the number of containers from the container ship 1 which have been discharged.

The process continues as follows. Containers 25 continue to be taken from the container ship 1 by the crane 7, placed on the pier 17, and transported by the mobile lift 9 to the intermodal rail area 15 where each import container is loaded onto a well car 21. The export containers 19 from the well cars 21 are transported by another mobile lift (11, 13, illustrated in FIG. 1) to either the container ship 1 or the intermodal transition zone 39. Whether the container is taken directly to the ship 1 or the intermodal transition zone 39 depends on the container's attributes, keeping in mind that containers must be loaded on the ship 1 as customarily determined by their attributes.

The number of containers 43 in the intermodal transition zone 39 and the number of containers discharged from the container ship 1 should be accounted for. The number of containers accumulated in the intermodal transition zone 39 is the function of the number of hatches in the container ship 1 that are worked at the same time, and the number of containers 23 in the on deck stow 29 of the hatches actually being worked, plus the number of containers 25 in the first vertical cell 27 which is to be worked in each hatch. The total number of containers 43 that will be held in the intermodal transition zone 39 before the container ship 1 can be loaded thus determines the required size of the intermodal transition zone 39. These intermodal transition zone containers 43 form a reservoir or buffer to ensure that a container 43 with the requisite attribute of size, weight, destination port and other typical concerns is available when needed to provide proper stow onto the container ship 1.

Therefore, the export containers 19 which are to be removed from the well cars 21 should be selected with these criteria in mind. To accomplish this, short blocks of well cars 21 should be sent to the marine rail facility just in time to keep the operation functioning efficiently. The well cars 21 should be selected based on their contents, according to industry-wide standard information, including shipper, consignee, steamship company, cargo and container, and labeled special cargo, etcetera. A conventional software database program which allows access by all interested parties can provide a way to identify and select such well cars 21.

The selection of containers to be loaded to the well cars 21 and thence to the train is accomplished in a different way. Ideally, only short blocks of well cars 21, not entire trains, would be loaded/unloaded at the Marine/Rail Interface facility. The container ship 1 was loaded to ensure that containers for priority in land destinations are concentrated in the on deck stow 29 and in the vertical cell 27 which will become the first cleared vertical cell 41. As the initial well cars 21 are loaded, they can be shuttled to an inland port where they can be combined with other rail cars until sufficient cars have been accumulated to form a train. These other rail cars could be cars with containers from the container ship 1 presently being worked, or cars with containers from other container ships, and/or rail cars containing containers with domestic cargo.

Once the container ship 1 commences this simultaneous load and discharge mode, an export container 19 can be loaded onto the container ship 1 as a new import container 3 is discharged from the container ship 1. Specifically, the crane 7 discharges an import container 25 from a next vertical cell 27 to be cleared on the pier 17. The mobile lift 9 has, meanwhile, placed an export container on the pier 17. Then, the crane 7 loads the export container into the cleared vertical cell 41.

Export containers 19 can be loaded directly from the well car 21 into the container ship 1. If the container 19 does not have the proper attributes to be loaded at the time, it should be stored in the intermodal transition zone 39, and replaced from the intermodal transition zone containers 43 with a container that does meet the loading requirements at the time, and thus be loaded onto the container ship 1. This particular stowing protocol can be maintained without any increase in the inventory of intermodal transition zone containers 43 contained within the intermodal transition zone 39.

The simultaneous load and discharge process continues until all of the import containers 25 have been discharged from the particular hatch. The container ship 1 now commences a load only operation until the last vertical cell 27 is filled, the hatch covers 31 replaced, and the on deck stow 29 is loaded with export containers.

The integrated simultaneous load and discharge of both the container ship 1 and the train can be maintained indefinitely as long as well cars 21 are supplied and removed "just in time" to maintain a proper balance of export and import containers. The significance is that a ship of any size can be worked without a further increase in the size of the yard, assuming the same number of cranes are used.

The only containers required to be inventoried on a dock at the site is that number of export containers discharged from the train which could not be loaded onto the container ship, until the container ship 1 could institute a simultaneous discharge mode of operation. The largest known ships today would require an inventory of a maximum of 105 containers for the largest hatches. The inventory of intermodal transition zone containers 43 is required to be maintained in the intermodal transition zone 39 only during the time those hatches are actually being worked. The maximum inventory in the intermodal transition zone 39 at any given time is therefore the sum of the number of hatches being worked multiplied by the number of containers that must be discharged from each particular hatch (hatches vary in capacity), before any simultaneous discharge and load operation can commence.

Once the first two containers 19 have been discharged from a well car 21, a simultaneous load and discharge operation with respect to the well cars can be commenced until the final two export containers 19 have been discharged and the final import containers 3 loaded onto the well cars 21.

The container ship 1 will maintain its simultaneous discharge and load operation until all import containers 25 have been discharged. At this point, the container ship 1 will convert to a load only operation until all the remaining export containers 19 have been loaded. The final containers loaded onto the container ship will come from the intermodal transition zone containers 43 contained in the intermodal transition zone 39.

At this stage, the last of the well cars 21 will have been loaded and have departed, and the train will have terminated, thus leaving the dock clear of containers 43. Thereafter, the efficient marine/rail interface facility can be used by another container ship, thus greatly increasing the efficient use of space. The efficiency of the invention thus described is dependent on whether well cars containing containers for a specific container ship are supplied to and removed from a location on dock or relatively close to the ship to maintain the balance of the system.

Figure 5:
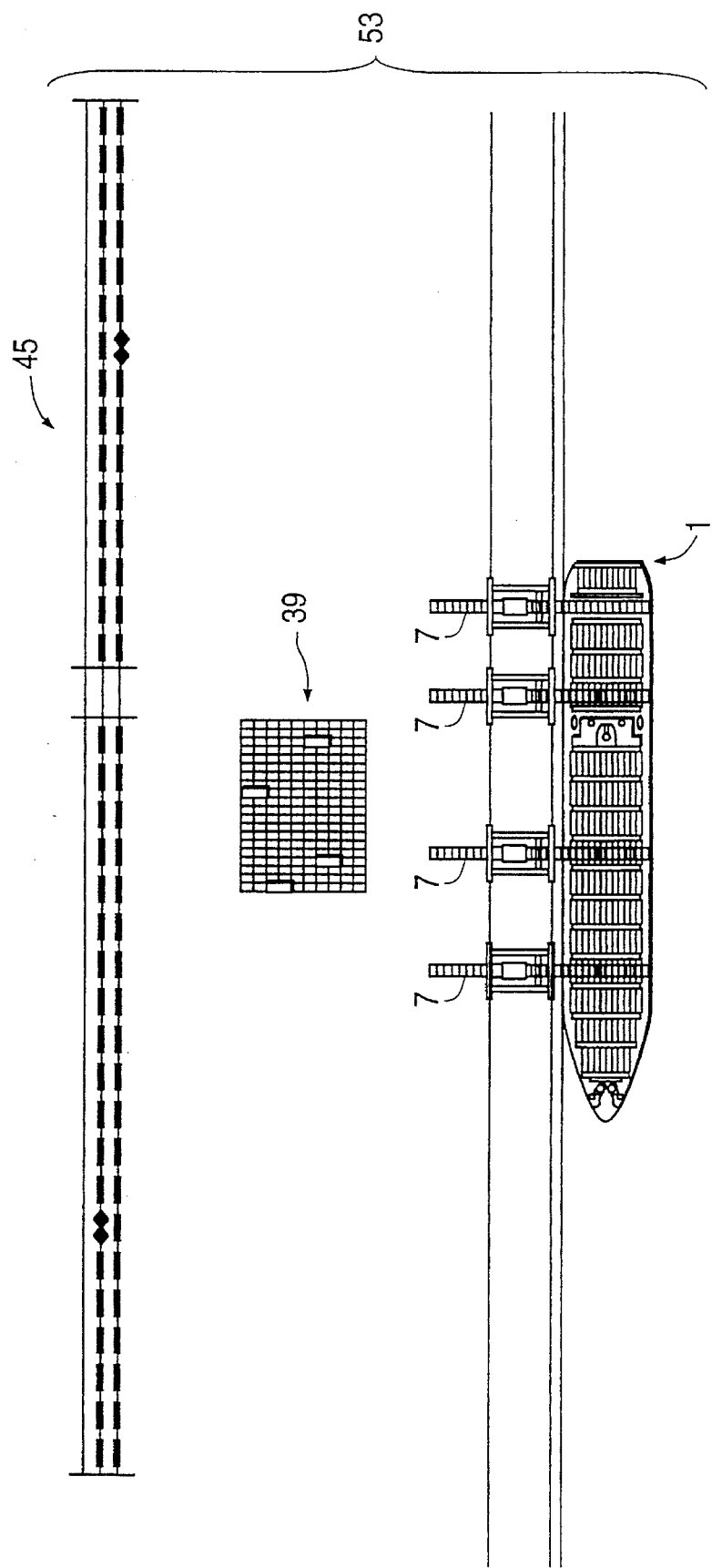
FIG. 5 is a plan view of one embodiment of the efficient marine/rail interface facility.

FIG. 5 is a plan view of the efficient marine/rail interface facility 53. The container ship 1 is illustrated, along with four cranes 7 unloading/loading the ships. The intermodal transition zone 39 at or near maximum capacity is placed between the ship 1 and an intermodal rail 45.

Figure 6:
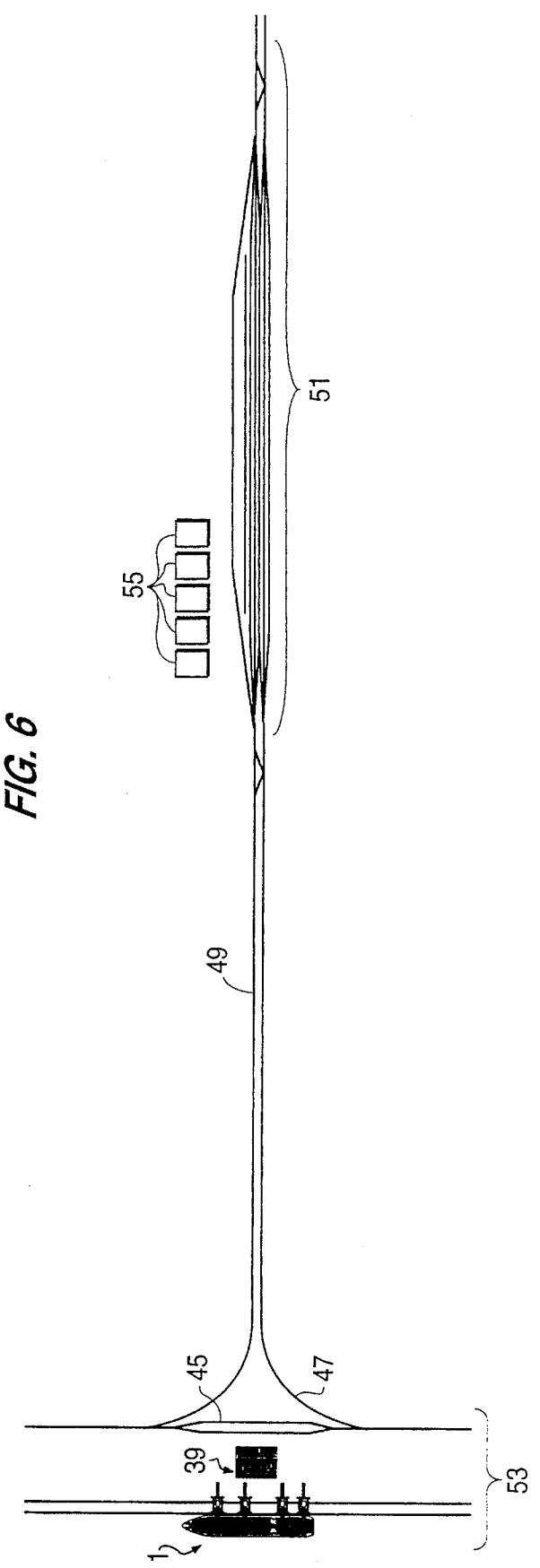
FIG. 6 is a plan view of the efficient marine/rail interface facility of FIG. 1, the intermodal rail access, and a corridor to the inland port facility.

FIG. 6 is a plan view of the marine/rail interface facility 53 illustrated in FIG. 5, an intermodal rail access 47 to the marine/rail facility 53, a corridor 49 and an inland port rework area 51. The corridor 49 can advantageously be developed through the city. Preferably, this is a grade separated corridor through the port city to the inland port rework area 51 located on the outskirts of the city. To maintain the required efficiency, a common electronic data base is provided with information on a real time or close to real time basis by all parties to the system (for example, ship operators, train operators, terminal operators, regulatory bodies such as customs, shippers and receivers of containers). One or more marine/rail interface facilities 53 could share access to the corridor 49 and thus the inland port rework facility 51. The inland port rework facility 51 could function as a storage facility for those containers in transition from one mode of transport to the other. Since the rework area 51 is located inland, efficient use of available land is not a great concern.

Trains which originate in the interior of the country with export containers destined for various ships and ship operators could terminate at the inland port rework area 51. Rail cars with containers for specified ships would be assembled into blocks of well cars, which would be held in the rework area 51 and dispatched via the corridor 49 to the marine/rail interface facility and thence the container ship on demand.

On the one hand, containers for local delivery are unloaded from the rail cars and held in a storage area 55 in the inland port rework area 51 until delivery can be accomplished. On the other hand, locally originating containers are received, loaded onto cars and consolidated into trains as required.

Blocks of cars dispatched from the inland port rework area 51 along the corridor 49 to a container ship 1 undergo the process described above and return to the inland port rework area 51 with other containers. These containers could either be for local delivery, or for movement by rail to an interior destination. As described above, the containers are sorted, so that containers for local delivery are unloaded and held in one of the storage areas 55 until delivery could be accomplished, whereas cars with containers for inland destinations are matched with other cars until a train is assembled and dispatched.

FIG. 7 is a cross sectional view of a portion of the inland port rework area. It illustrates a preferred embodiment including a rail mounted gantry crane 59. This rail mounted gantry crane 59 spans 6 rail tracks 69. In the present illustration, the rail mounted gantry crane 59 is in the process of "reworking" or rearranging selected double stack car containers 71 to make up cars that can be shuttled to the marine/rail interface facility 53 (illustrated in FIG. 6) as required, grounded for local delivery, or picked up and loaded for assembly into trains with import cargo for dispatch to interior destinations.

The work done at the rework area includes breaking down trains with cargo for export so that short blocks of cars with containers for specific container ships are dispatched via the corridor 49 to the container ships as required (see FIG. 6). The work to be done also consists of receiving, via the corridor 49, rail cars of containers from the various container ships destined to numerous inland locations and reworking or reassembling these cars to make up trains to be dispatched to these locations.

As further illustrated in FIG. 7, a mobile lift or truck 61 can transport containers 71 from the loaded well cars 67 to a storage area 73. It is possible that the containers 71 can be removed from the mobile lift to the storage area via a rubber tire gantry 57. An unloaded well car 63 and a partially loaded well car 65 are illustrated.

The information necessary to manage this intermodal exchange of containers between ship, rail and truck is contained in a common user electronic data management system 75, illustrated in FIG. 8. Input is provided from/to the various user systems 83 and may include transponder devices 77 attached to the containers 71 and strategically located throughout the system on cranes, mobile lifts and other prime movers, and at appropriate gates and yard locations. Thereby, the attributes of specific containers in the actual locations can be tracked and coordinated and stored in a data base 81. It is advantageous to designate a system manager 79 to control the activities of the users of the electronic data management system 75. This system manager can also utilize the system to control the efficient operation thereof. The use of the computer system is preferable to implement the sending of short blocks of cars to the marine/rail facility just in time to keep the system working efficiently.

Reference is made back to FIG. 6. The storage area 55 includes containers from several common users. At the rework area 51, the containers can be grouped by attributes, for example, consignee and by destination. At the rework area 51 the containers should be tracked by both their location and by attributes. This is preferably performed by a software package on a programmable computer. This computer may be the same as the computer system for the data management system.

The mobile lifts that are illustrated in the figures are mechanical types of devices for picking up containers. These mobile lifts include straddle carriers, such as illustrated in the figures. Also available are top picks, side picks, smaller gantries, rubber tired gantry cranes, etcetera. Thus, "mobile lift" is used herein as a generic term for this mechanical device which transports a container from one point to another.

Similarly, various cranes have been illustrated in the figures. One appropriate crane is a rail mounted gantry known as the MIJACK rail mounted gantry. Other appropriate rail mounted gantries are available in the industry.

Reference is made back to FIG. 6. The corridor 49 is ideally a grade separated corridor from ship side through the existing city, to an inland area. Thereby, rail cars can be shuttled without interference to or by local road traffic. A major advantage is a reduction in highway traffic congestion, air and noise pollution close to major population centers. The rework area 51 could therefore be located, for example, 75 miles away from the ship. In a simulation test, it has been demonstrated that the present invention may be approximately 90% more efficient in its use of available marine land compared to conventional methods in use today.

FIG. 8 illustrates the common user electronic data management system utilized to manage this intermodal exchange of containers between ship, rail and truck. A data management system 75 receives inputs indicating the location and characteristics of containers 71. The location of the container 71 may be optionally indicated by a transponder device 77 connected to a container 71. A designated system manager 79 can monitor and control activities of users of the data management system 75. The locations and characteristics corresponding to containers may be stored in a database 81 accessed by the data management system 75. User systems 83 operated by various users of the system may access and/or transmit information concerning containers.

Decision-support systems for the transportation industry are commercially available. Such computer systems include the SPARCS "synchronous planning and real-time control system", using a work station, graphic user interface, local area network and client-server architecture. Another system is the CAPS II, "computer-aided preplanning system II," used by port captains to plan a container ship stowage for a specific port, as well as by central planners to strategically plan stowage for a series of port calls. Other conventional systems are available TACTICS (implemented on an Apple-Macintosh II), CAPS (using an IBM mainframe), and DART (implemented on a work station).

The actual system that is implemented ideally includes ship stowage and planning, marine terminal yard planning and inventory control, equipment control and tracking, intermodal transition zone management and on-deck rail car planning and loading. Moreover, the system ideally includes inland rework facility management and inventory control, plus a system for scheduling trains between the inland and marine/rail interface facilities. In the preferred embodiment, most or all of the above computer systems are utilized together to produce the most efficient system.

PROPHETIC EXAMPLE 1

One projected example of the efficient marine/rail interface involves the use of the invention in the Alameda Corridor, a 20-mile high-capacity grade separated dedicated/ train corridor which could serve the long-term port access needs for the Los Angeles and Long Beach harbors.

It is projected that implementation of the invention in the Alameda Corridor could virtually eliminate truck traffic in and around the port area. Train stoppages, which cause severe tie-ups on city streets, could be reduced by 75%, and locomotive hours of operation could be reduced by 30%. Train-related noise and vibration would be reduced by 50%. Air quality would be improved significantly due to reduced vehicular delay, reduced truck traffic, reduced traffic congestion and reduced locomotive hours of operation. Implementation of the invention is projected to increase the feasibility for railroad electrification.

For the ports of Los Angeles and Long Beach, it is projected that such issues could translate into a requirement of 2,400 acres of landfill to accommodate port activities otherwise required in the future. Of course, as discussed above, environmental concerns would hinder such substantial landfill. Therefore, the invention described herein eliminates the need to acquire the 2,400 acres, as is forecast in the 20/20 plan for the Los Angeles basin. The invention could reduce land requirements with a savings over conventional operating systems by a factor as much as 9 to 1.

COMPUTER SIMULATION OF THE EFFICIENT MARINE/RAIL INTERFACE

The efficient marine/rail interface as described herein was simulated by a computer to validate the potential for increased efficiency. The computer mimicked real-world operations of a marine/intermodal rail operation. Several assumptions were built into the simulation model. The validity of these assumptions was verified through interviews with actual terminal operators. The following are some of the key assumptions:

container ships are post-panamax class, equipped with the largest vessel hatch known today. The vessel hatch is equivalent to 16 containers wide, 6 containers deep on deck and 9 containers deep in each cell, resulting in 3,500 to 4,500 in TEUs (2,000 to 3,000 containers) per vessel.

All containers are loaded and discharged at a single U.S. port (worst case scenario); export cargo loaded on the vessel is destined for a maximum of four foreign ports.

Rail is the sole overland transport mode, with all containers either originating from or loaded onto rail cars.

The rail is situated on or close to the dock.

Sufficient trackage exists to allow continuous loading for two destination routes with blocked trains switched in and out "just in time" as required; the model assumes two working tracks and a switch track.

Trains arrive with export containers randomly mixed for all four destination ports; there is no attempt to presort or rework according to destination blocking of containers prior to arrival at the port area.

All containers arriving by rail are designated for the specific container ship.

A critical mass of containers is available in the intermodal transition zone to ensure precise vessel stowage on a random-access basis; the critical mass provides a very high probability that a container with appropriate attributes of size, weight, destination, etc. is available for the next crane move.

A management system is available and used to affectively coordinate real-time movement of specific containers between container ship and rail.

Four cranes are deployed to work the vessel, each achieving current industry standards of ±25 productive moves per hour, the average for both single and dual cycle modes.

Straddle carriers are used as transfer vehicles due to their capability of transporting containers to both ship and rail without additional handling equipment.

Sufficient equipment (straddle carriers) is available and deployed to achieve a balanced operation on which the load and discharge of the train is equal to that of the ship.

The conceptional terminal layout (illustrated in FIG. 5) includes the ship berth, rail and intermodal transition zone located in a parallel configuration.

In the simulation, the average traveling distance for any straddle carrier was assumed to be 2,500 feet, and it was assumed that sufficient planning and management controls would be available to eliminate any traffic congestion problems. Three straddle carriers per crane moved containers between the intermodal transition zone and the ship, with certain moves directly from ship to rail. For movement of containers between the intermodal transition zone and the intermodal rail area, eight straddle carriers were provided. Straddle carriers serving the vessel operated in a dual-cycle mode whenever vessel loading/unloading operations allowed, while straddle carriers serving the intermodal rail area operated in a dual-cycle mode for the duration of the combined operations.

The container ship to intermodal transition zone operation operated nearly simultaneously with the intermodal transition zone to intermodal rail area operation, with train operations beginning within 15 minutes of the container ship operations. This provided enough time to discharge several containers from the container ship, so that the intermodal rail area straddle carriers could begin dual cycling from the start. All containers placed into or taken out of the intermodal transition zone were monitored.

As a result of running the simulation model it was observed that no significant delays were encountered by any specific piece of container-handling equipment, indicating a balanced and smooth exchange of containers between the ship and the intermodal trains. It was possible to monitor the contents of the intermodal transition zone throughout the operation. The simulation model show that the size of the intermodal transition zone is related to the above-deck capacity of the ship base being serviced.

To verify the model indications, a second scenario was tested which varied the size of the vessel base or hatches to be serviced. The discharge and loading of the largest existing bay or hatch configuration was muddled. This hatch consists of 94 containers above deck and 106 below deck, with a total single-cycle discharge requirement of 103 containers. The maximum requirement during the steady-state operation was approximately equal to the sum of the single-cycle discharge quantity for all working gantry cranes, or an intermodal transition zone requirement of approximately 400 containers.

It is projected that if the size of the ship were to decrease, so would the on-deck capacity, as well as the number of gantry cranes that could be effectively used to service the ship. In addition, if the container stowage requirements were increased, the laws of probability suggest that a quantity of containers larger than the single-cycle discharge quantity would be required in order for a container of the proper characteristics to be available. Likewise, if the percentage of intermodal cargo were to decrease, the same effect would occur.

The simulation model was also run at a lower value of intermodal moves and the results were as projected. However, increasingly larger containerships are expected in the future, providing such a large quantity of containers that one of the proper type will always be available.

Figure 9A:
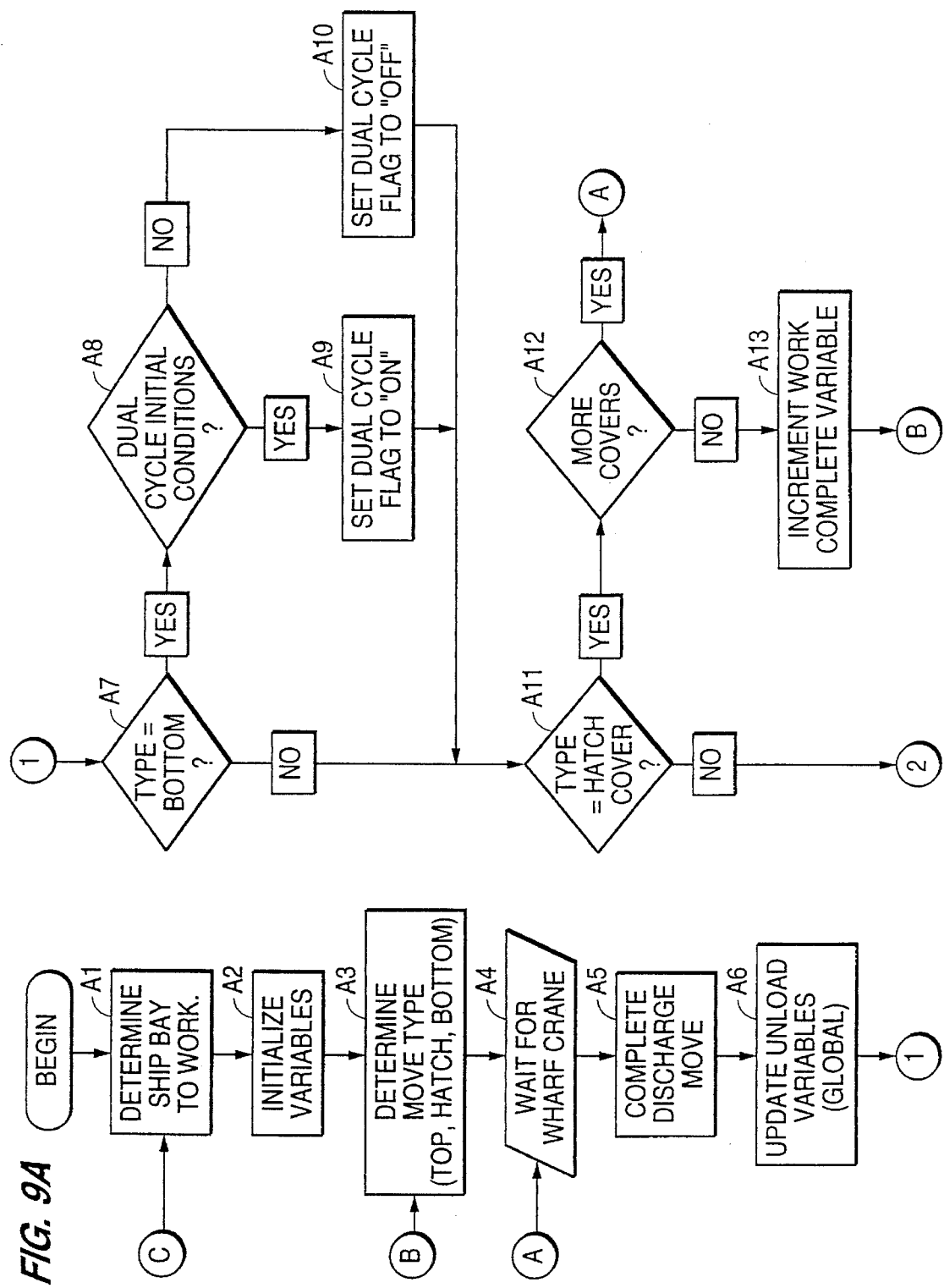
FIGS. 9A–9C are a flowchart of the container ship operations process.
Figure 9B:
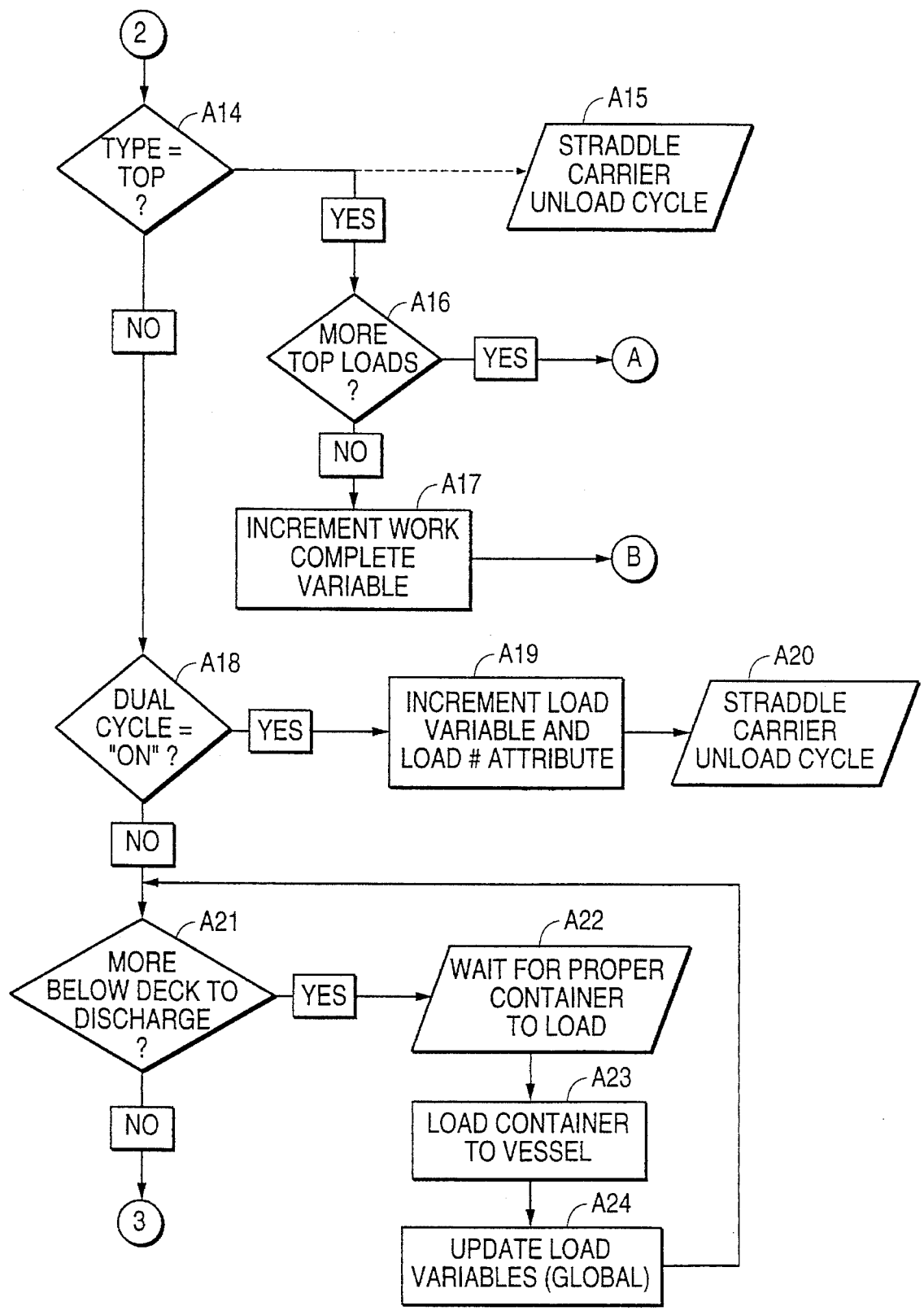
Figure 9C:
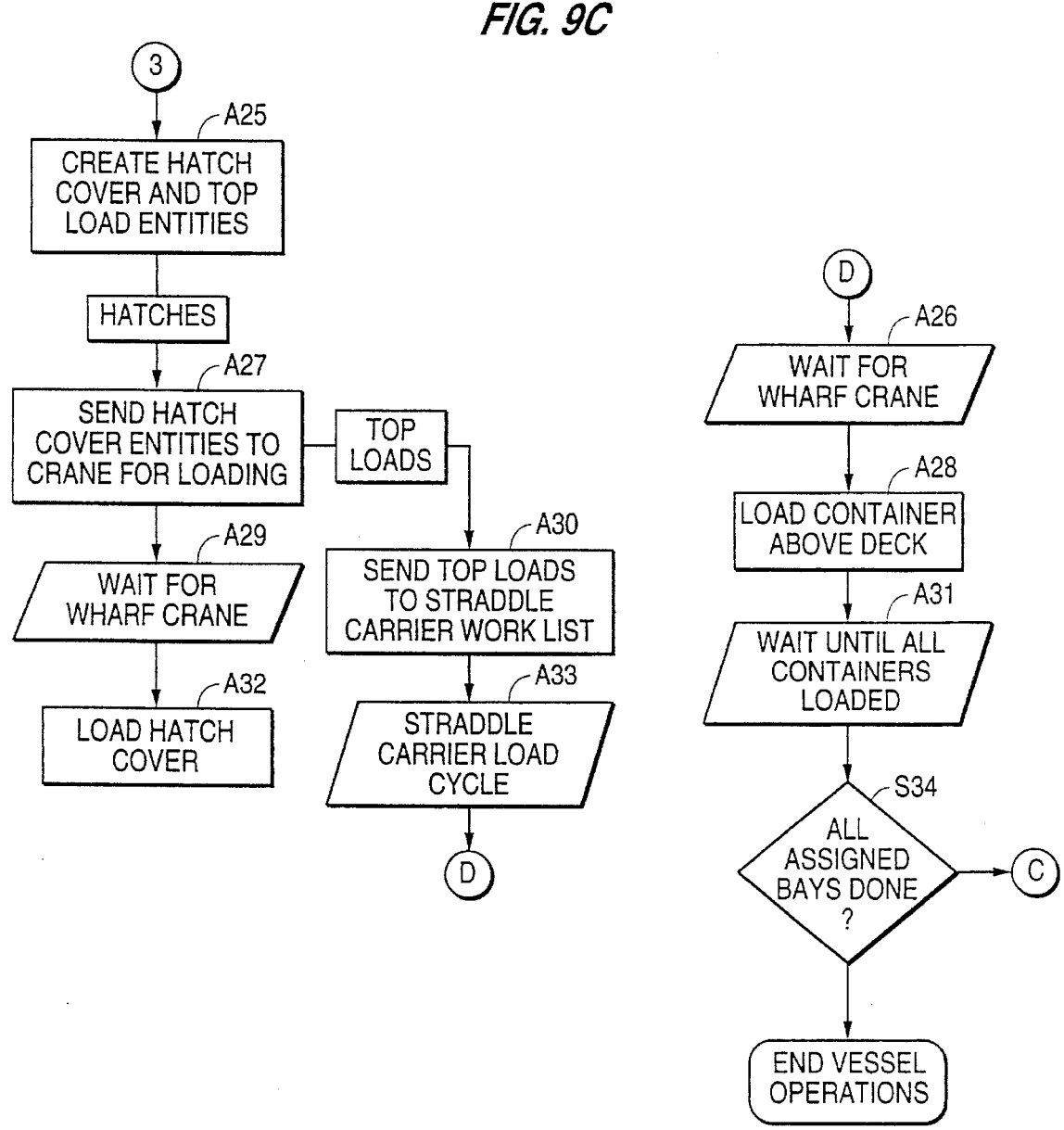
Figure 10:
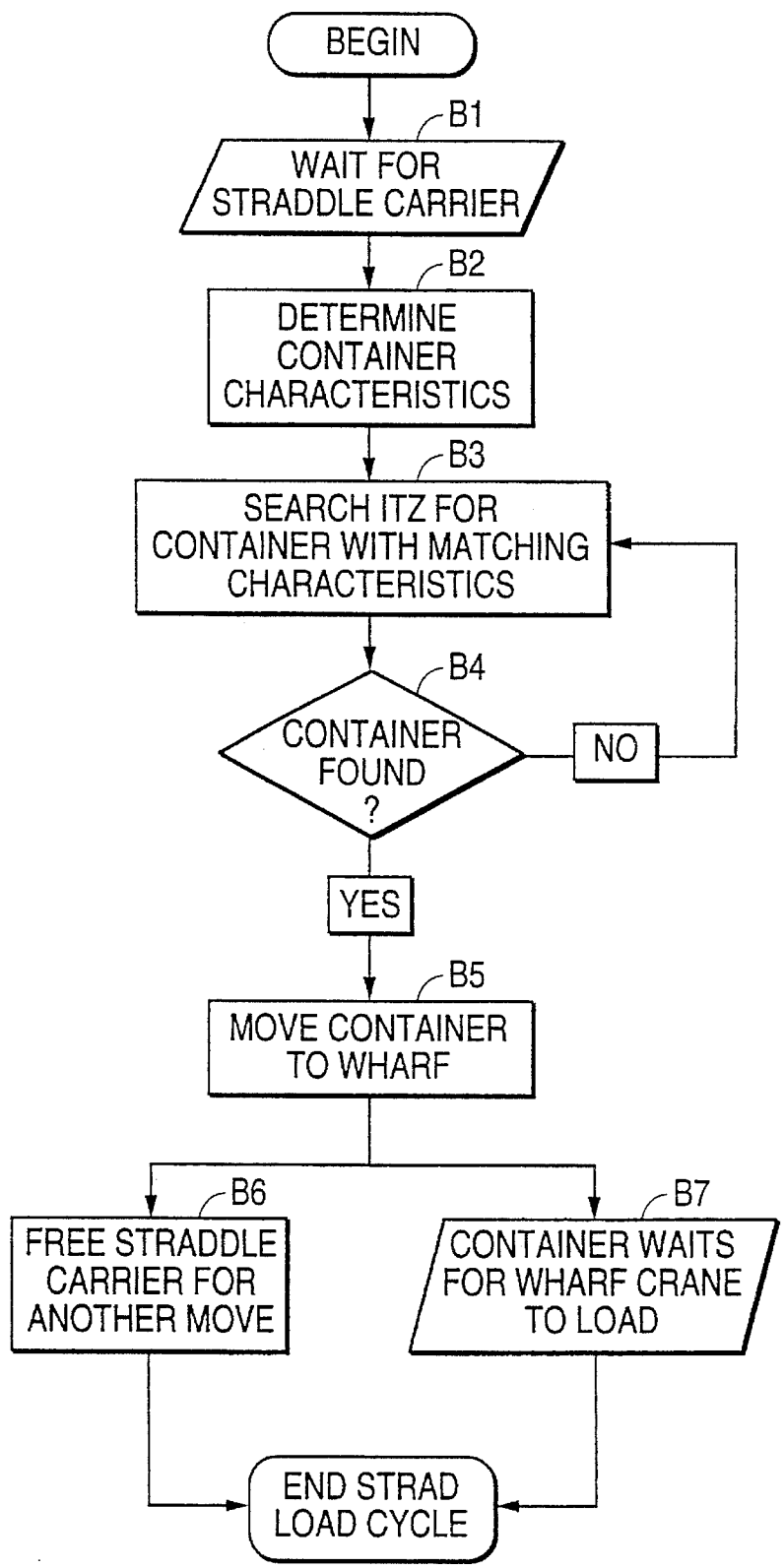
FIG. 10 is a flowchart of a straddle carrier load cycle.

The process flow charts associated with the simulation model are illustrated in FIGS. 9–12. FIGS. 9A–9C concern the containership operations process. FIG. 10 concerns the intermodal transition zone straddle carrier load cycle; whereas FIG. 11 concerns the intermodal transition zone straddle carrier unload cycle. FIGS. 12A–12B concern the well car operations. Although these flow charts apply to the simulation model, they can be used to more precisely determine the steps used in the method of the invention as it is implemented. Obviously, certain of the steps which are illustrated in the flow chart in FIGS. 9–12 are omitted if they are inapplicable to actual use.

Reference is made to FIGS. 9A–9C, concerning the container ship operations process. Initially, at step A1, the system determines which ship bay or hatch to work. At step A2, the system initializes the variables (this is a step which would be omitted most likely in normal operations). At step A3, the type of move is determined (top, hatch, or bottom). Step A4 consists of waiting for a wharf crane to be available. At step A5, a container discharge move is completed. At step A6, applicable primarily to the simulation model, unload variables are updated. At step A7, it is determined whether the type of move is a bottom move. If so, at step A8, it is determined whether a dual cycle initial condition exists. If the condition exists, the dual cycle flag is set to on in step A9; if the condition does not exist, the dual cycle flag is set to off in step A10. Then, it is determined whether the type of move is a hatch cover move, at step A11. If so, it is determined at step A12 whether more covers exist. If so, the system repeats back to step A4, where it waits for the wharf crane prior to completing a discharge move. If there are no more covers at step A12, at step A13, the work complete variable is incremented (this is another step that would be omitted in an actual system most likely). It is then determined whether the type of move is a top move, at step A14. If so, the straddle carrier unload cycle, step A15 (illustrated in FIG. 11) may be initiated. Also, it is then determined at step A16 whether there are more top loads. If there are more top loads, the system goes back to step A4, and waits for the wharf crane in order to complete the discharge move. If there are no more top loads, the system increments the work complete variable (a step which is omitted in the actual system), and then proceeds to step A3, where it will determine the next move type.

On the other hand, if at step A14 the type of move is determined not be a top move, it is determined whether dual cycle is on at step A18. If so, at step A19, the load variable and load number attributes are incremented (a step which is omitted in the actual system), and at step A20, the straddle carrier unload cycle (see FIG. 11) is initiated. If the dual cycle is not on, as determined at step A18, it is determined whether there is more below deck to discharge at step A21. If so, the system waits at step A22 for a proper container to load. At step A23, the container is loaded to the vessel. At step A24, omitted in the actual system, load variables are updated.

Note that steps A21–24 are repeated in both FIGS. 9B and 9C for clarity. If it is determined that there is no more below deck to load, at step A25, hatch cover and top load entities are created (a step which pertains solely to simulation), and at step A27, the hatch cover entities are sent to the crane for loading. At step A29, the system waits for the wharf crane, and then loads the hatch cover at step A32. Meanwhile, at step A30, top loads are sent to the straddle carrier work list, and at step A33, the straddle carrier load cycle (see FIG. 10) is initiated. At step A26, the system waits for the wharf crane and at step A28, the system loads the container above deck, and then waits until all containers are loaded at step A31. At step A34, it is determined whether all assigned bays or hatches are done. If not, the system recommences its step A1.

Reference is made to FIG. 10, showing the intermodal transition zone straddle carrier load cycle. Initially, at step B1, the system waits for a straddle carrier. Then, the system determines the desired container characteristics, at step B2. At step B3, the system searches the intermodal transition zone database for a container with characteristics matching the desired characteristics. Step B4 provides that the search is performed until the container is found. At step B5, once the container is found, it is moved to the wharf. At step B7, the container waits for a wharf crane to load it onto the container ship. Meanwhile, at step B6, the straddle carrier is freed for another move. Thus ends the straddle carrier load cycle.

Figure 11:
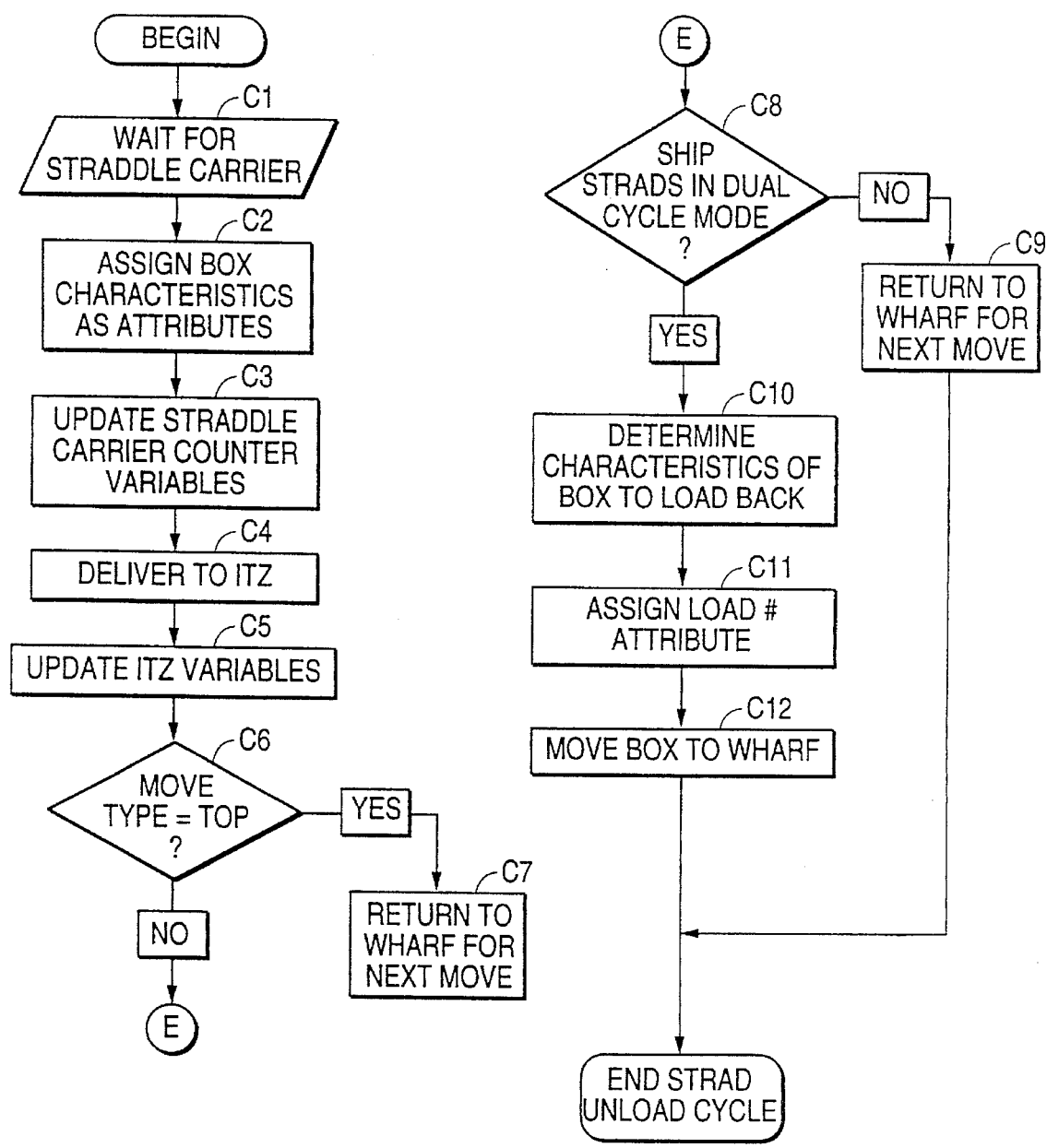
FIG. 11 is a flow chart of a straddle carrier unload cycle.

FIG. 11 illustrates the intermodal transition zone straddle carrier unload cycle. Initially, at step C1, the system waits for an available straddle carrier. Once one is available at step C2, the characteristics of the container, or "box", are assigned as attributes. At step C3, applicable to the simulation model, straddle carrier counter variables are updated. Next, at step C4, the straddle carrier delivers the container to the intermodal transition zone, followed by updating the intermodal transition zone variables at step C5. At step C6, it is determined whether the type of move is a top move. If so, the straddle carrier returns to the wharf for the next move at step C7. If the move type is not a top move, and if it is determined in step C8 that the ship straddle carriers are not in dual cycle mode, the straddle carrier returns to the wharf for the next move, as specified in step C9. On the other hand, if the move type is not a top move, and the ship straddle carriers are in the dual cycle mode, the system determines the desired characteristics of a container box which should be loaded back onto the container ship at step C10. At step C11, the system assigns a load number and attributes to the container box, and at step C12, the straddle carrier moves the container box to the wharf.

Figure 12A:
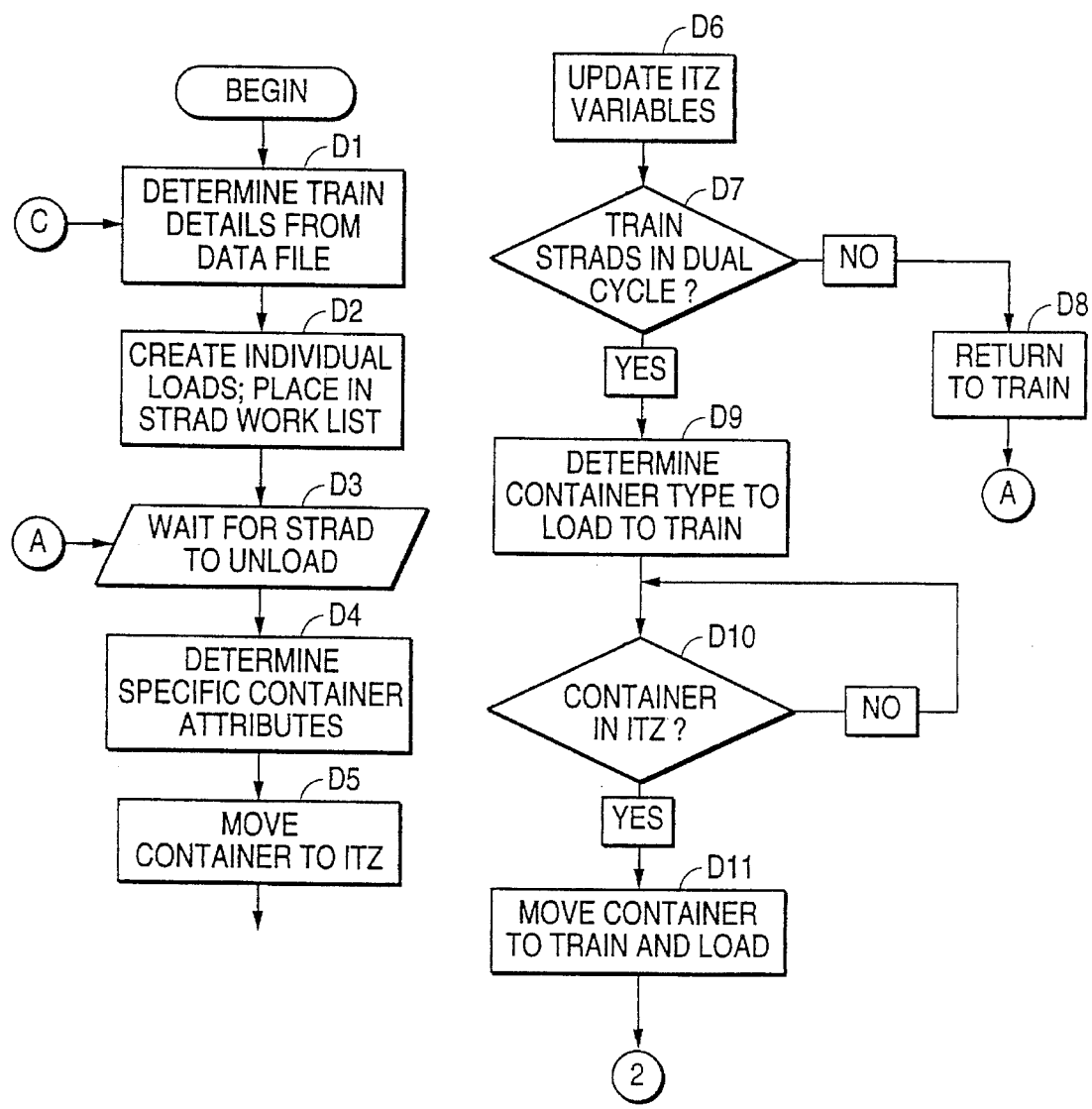
FIGS. 12A–12B are a flowchart of the well car operations.
Figure 12B:
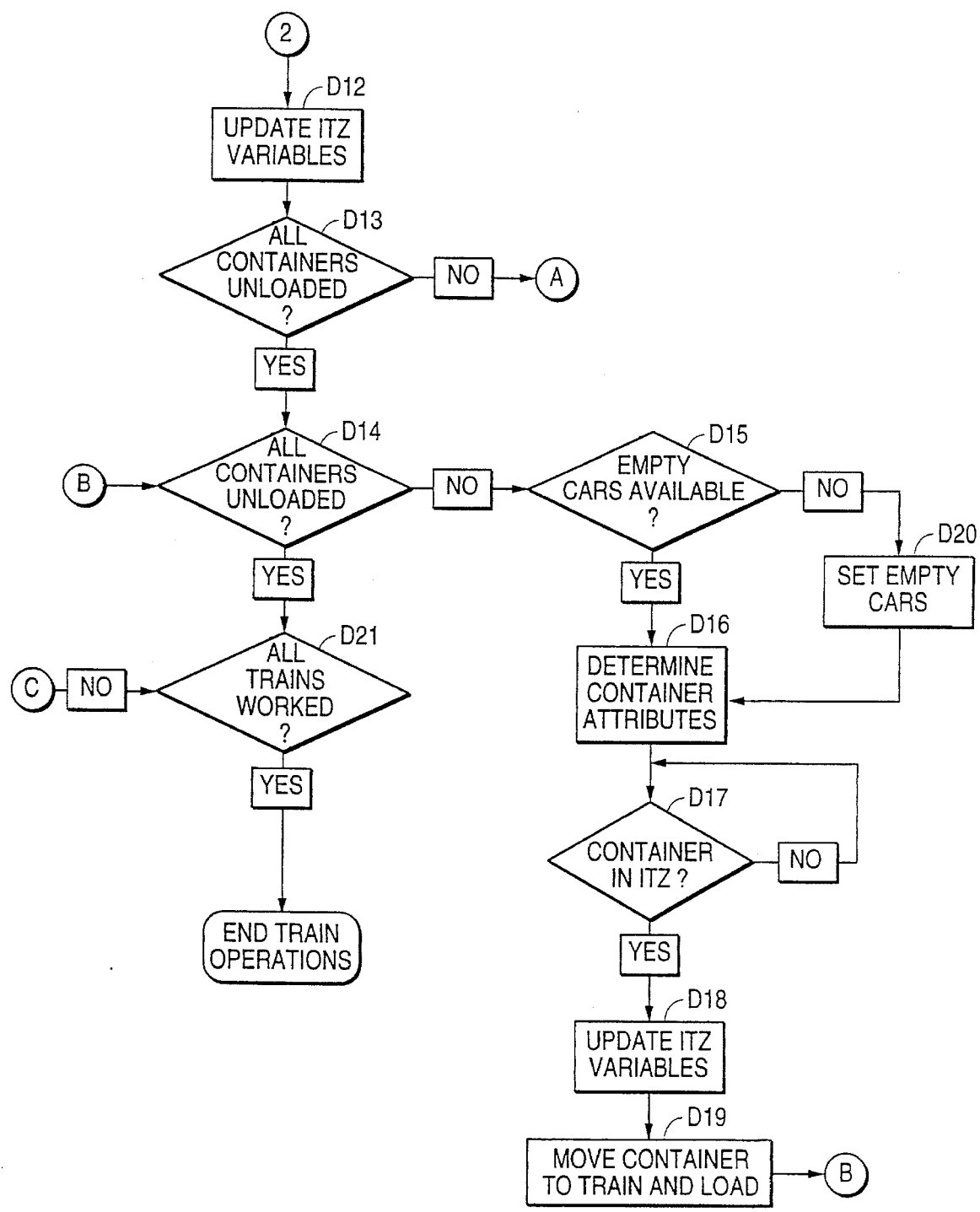

FIGS. 12A and 12B concern well car operations. At step D1, the system determines details of the train from a data file. At step D2, the system creates a record of individual container loads and places them in a straddle carrier work list. At step D3, the system waits for a straddle carrier associated with the intermodal rail area to unload. Next, at step D4, the system determines specific container attributes, and at step D5, the straddle carrier moves the container to the intermodal transition zone, and updates the intermodal transition zone variables in the database at step D6. If the intermodal rail area straddle carriers are operating in a dual cycle, determined at step D7, they return to the train at step D8, and then wait for the straddle carrier to unload, continuing at step D3. If the train straddle carriers are in the dual cycle, the system determines the desired container type which should be loaded to the train at step D9. At step D10, the system locates one such container in the intermodal transition zone. At step D11, the straddle carrier moves the container to the train, and loads the container. The intermodal transition zone variables are updated in the database at step D12. If all containers are not unloaded, at step D13, the system again waits for a straddle carrier to unload at step D3. On the other hand, if all containers are unloaded from the train, the system determines if all containers in the intermodal rail area are loaded onto a train. If not, at step D15, the system determines if there is an empty well car available. If there is no empty car available, at step D20, the system so indicates and proceeds to step D16, described below. Then, the system determines desired container attributes at step D16, and at step D17, determines whether such a container is available in the intermodal transition zone. If that container is located in the intermodal transition zone, the system at step D18 updates the intermodal transition zone variables in the data base, and at step D19, moves the container to the train and loads it onto the train. The system then proceeds to step D14, and determines whether all containers are loaded onto the train. If all containers are loaded onto the train at step D14, but not all trains are worked, as determined at step D21, the system repeats back to step D1. On the other hand, if all trains are worked, as determined at step D1, the well car operations terminate.

While specific embodiments of the invention have been described and illustrated, it will be clear that variations in the details of the embodiments specifically illustrated and described may be made without departing from the true spirit and scope of the invention as defined in the appended claims.

What is claimed is:

1. A method of exchanging export and import containers between a container ship and land transports, comprising the steps of:
   (a) discharging a first plurality of import containers from a vertical cell to a location adjacent to the container ship, transporting each of the containers of the first plurality from the location to an intermodal rail area, thereby creating a cleared vertical cell;
   (b) discharging a first plurality of export containers from a plurality of land transports in the intermodal rail area into an intermodal transition zone, and loading the plurality of land transports with import containers in the intermodal rail area; and then
   (c) performing a simultaneous load and discharge of the container ship and the land transports comprising the substantially synchronous steps of:
      (1) unloading one of the export containers from the land transport in the intermodal rail area; based on the characteristics of the unloaded export container, transporting the unloaded export container to the location adjacent to the container ship, or transporting the unloaded export container to the intermodal transition zone and transporting one of the export containers from the intermodal transition zone to the location adjacent to the container ship; and loading the export container from the location adjacent to the container ship into the cleared vertical cell; and
      (2) discharging one of the import containers from a next vertical cell in the container ship; transporting the discharged import container to the intermodal rail area; and loading the discharged import container in the intermodal rail area onto the unloaded land transport.

2. The method as claimed in claim 1, further comprising the step of discharging a second plurality of import containers from an on-deck stow of the container ship to the location adjacent to the container ship, prior to the step of discharging the first plurality of import containers from the vertical cell.

3. The method as claimed in claim 1, wherein step (c)(1) further comprises, for each land transport:
   (d) unloading the export containers from the land transport until a well car in the land transport is empty;
   (e) loading a portion of the import containers onto the land transport until the well car in the land transport is full; and
   (f) obtaining a next well car to unload.

4. The method as claimed in claim 3, wherein step (a) is performed by a crane, step (b) is performed by one of a plurality of mobile lifts, step (d) is performed by one of the plurality of mobile lifts, the transporting step of step (e) is performed by one of the plurality of mobile lifts, and step (f) is performed by one of the plurality of mobile lifts.

5. The method as claimed in claim 1, further comprising the step of transporting the import containers to a rework area and transporting the export containers from the rework area.

6. The method as claimed in claim 5, wherein the containers are transported to and from the rework area via an intermodal rail.

7. The method as claimed in claim 5, wherein the rework area is an inland port.

8. The method as claimed in claim 5, further comprising the step of reworking the containers in the rework area.

9. The method as claimed in claim 1, further comprising the step of tracking the import containers and the export containers in a data management system.

10. The method as claimed in claim 9, wherein the tracking step comprises sending a location and contents of the container to the data management system.

11. The method as claimed in claim 1, further comprising the step of clearing a second one of the vertical cells.

12. The method as claimed in claim 11, wherein the second one of the vertical cells is on an opposite side of the container ship.

13. The method as claimed in claim 11, wherein the second one of the vertical cells is adjacent to the cleared vertical cell.

14. The method as claimed in claim 1, further comprising the step of determining and selecting import containers to load on the land transports based on container characteristics of the import containers.

15. The method as claimed in claim 1, further comprising the step of determining and selecting export containers to load in the cleared vertical cell based on container characteristics of the export containers.

16. The method as claimed in claim 1, wherein a plurality of cranes are provided for discharging the container ship.

17. The method as claimed in claim 1, wherein the location adjacent to the container ship is a pier.

18. The method as claimed in claim 1, wherein the intermodal transition zone is intermediate to the intermodal rail area and the location adjacent to the container ship.

19. The method as claimed in claim 5, further comprising storing a portion of the import and export containers in a storage area prior to on-carriage.

20. The method as claimed in claim 9, further comprising the step of providing an access to the data management system by user systems.

21. The method of claim 1, further comprising, after step (c), the step of loading export containers remaining in the location adjacent to the ship onto the container ship.

* * * * *